United States Patent
Wang

(10) Patent No.: US 7,664,977 B2
(45) Date of Patent: Feb. 16, 2010

(54) SYSTEM AND METHOD FOR COOLING A CPU PASSIVELY

(75) Inventor: Fei-Zhou Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 312 days.

(21) Appl. No.: 11/309,704

(22) Filed: Sep. 15, 2006

(65) Prior Publication Data

US 2007/0086160 A1 Apr. 19, 2007

(30) Foreign Application Priority Data

Oct. 17, 2005 (CN) .................. 2005 1 0100547

(51) Int. Cl.
*G08B 17/00* (2006.01)
*G06F 1/32* (2006.01)

(52) U.S. Cl. ............... 713/322; 713/323; 710/267; 702/132; 340/584; 340/588

(58) Field of Classification Search ............. 710/267; 702/132; 713/322–323; 340/584, 588
See application file for complete search history.

(56) References Cited

U.S. PATENT DOCUMENTS 6,166,907 A 12/2000 Chien
6,172,611 B1 * 1/2001 Hussain et al. ............ 340/584

* cited by examiner

*Primary Examiner*—John K Ford
(74) *Attorney, Agent, or Firm*—Wei Te Chung

(57) ABSTRACT

The present invention provides a method for cooling a CPU. The method includes the steps of: setting a passive cooling mode; setting a critical temperature and a reference temperature that is lower than the critical temperature; setting a plurality of temperature intervals between the reference temperature and the critical temperature; predetermining a duty cycle corresponding to each temperature interval; detecting a current temperature of the CPU; comparing the current temperature with the reference temperature and the critical temperature; entering into the passive cooling mode if the current temperature is between the reference temperature and the critical temperature; confirming which temperature interval the current temperature falls in; confirming a corresponding predetermined duty cycle according to the temperature interval; and switching the CPU between a working status and a sleeping status according to the confirmed predetermined duty cycle. A related system is also disclosed.

8 Claims, 3 Drawing Sheets

SYSTEM AND METHOD FOR COOLING A CPU PASSIVELY

FIELD OF THE INVENTION

The present invention relates to system and method for cooling a CPU, especially to a system and method for cooling a CPU passively.

DESCRIPTION OF RELATED ART

With the performance of computer hardware and software continually improving and with the data processing frequencies of computer components becoming higher, the speed of data processing becomes more faster and the quantity of heat produced vastly increases. As a result, a central processing unit (CPU) is one of the components that produce most heat.

A CPU is an operation center of a computer. During the operation of the computer, the CPU produces heat that must be quickly carried away from the CPU. Excessively high temperature of the CPU will cause the CPU to be permanently damaged. Various cooling means have been developed for dissipating heat from the CPU. There are two modes for cooling the CPU, one is an active cooling mode and the other is a passive cooling mode. By utilizing the active cooling mode, an operating system or a basic input/output system takes a direct action, such as turning on a CPU mounted fan, to cool down the CPU. The advantage of the active cooling mode is the increased airflow over the CPU's metal slug or heat sink allows the heat to be drawn out of the CPU relatively quickly. By utilizing the passive cooling mode, CPU throttling alone with prevents further heating of the CPU. Generally, the passive cooling mode is acted as an effectual complementarity to the active cooling mode.

In the passive cooling mode, duty cycles of the CPU are predetermined to reduce working times of the CPU according to an advanced configuration and power interface (ACPI), thereby reducing the heat of the CPU. The predetermined duty cycles are the ratios of active time to the total cycle time of the CPU. However, it is limited to cool the CPU passively according to the ACPI. For example, if a given operating system does not support the ACPI, thus, the passive cooling mode cannot react on the CPU under the given operating system.

What is needed, therefore, is a system and method that can cool the CPU passively in any operating system.

SUMMARY OF THE INVENTION

A system for cooling a CPU is provided. The system includes a setting module, a sending module, a confirming module, and a cooling control module. The setting module is configured for setting a passive cooling mode, for setting a critical temperature, for setting a reference temperature that is lower than the critical temperature, for setting a plurality of temperature intervals between the reference temperature and the critical temperature, and for predetermining a duty cycle corresponding to each temperature interval. The sending module is configured for detecting a current temperature of the CPU. The confirming module is configured for comparing the current temperature with the reference temperature and the critical temperature, for confirming which temperature interval the current temperature falls in, and for confirming a corresponding predetermined duty cycle according to the temperature interval. The cooling control module is configured for entering into the passive cooling mode if the current temperature is confirmed to be between the reference temperature and the critical temperature, and for switching the CPU between a working status and a sleeping status according to the confirmed predetermined duty cycle.

Furthermore, a method for cooling a CPU is provided. The method includes the steps of: setting a passive cooling mode; setting a critical temperature and a reference temperature that is lower than the critical temperature; setting a plurality of temperature intervals between the reference temperature and the critical temperature; predetermining a duty cycle corresponding to each temperature interval; detecting a current temperature of the CPU; comparing the current temperature with the reference temperature and the critical temperature; entering into the passive cooling mode if the current temperature is between the reference temperature and the critical temperature; confirming which temperature interval the current temperature falls in; confirming a corresponding predetermined duty cycle according to the temperature interval; and switching the CPU between a working status and a sleeping status according to the confirmed predetermined duty cycle.

Other advantages and novel features of the present invention will become more apparent from the following detailed description of preferred embodiments when taken in conjunction with the accompanying drawings.

DETAILED DESCRIPTION OF THE INVENTION

Figure 1:
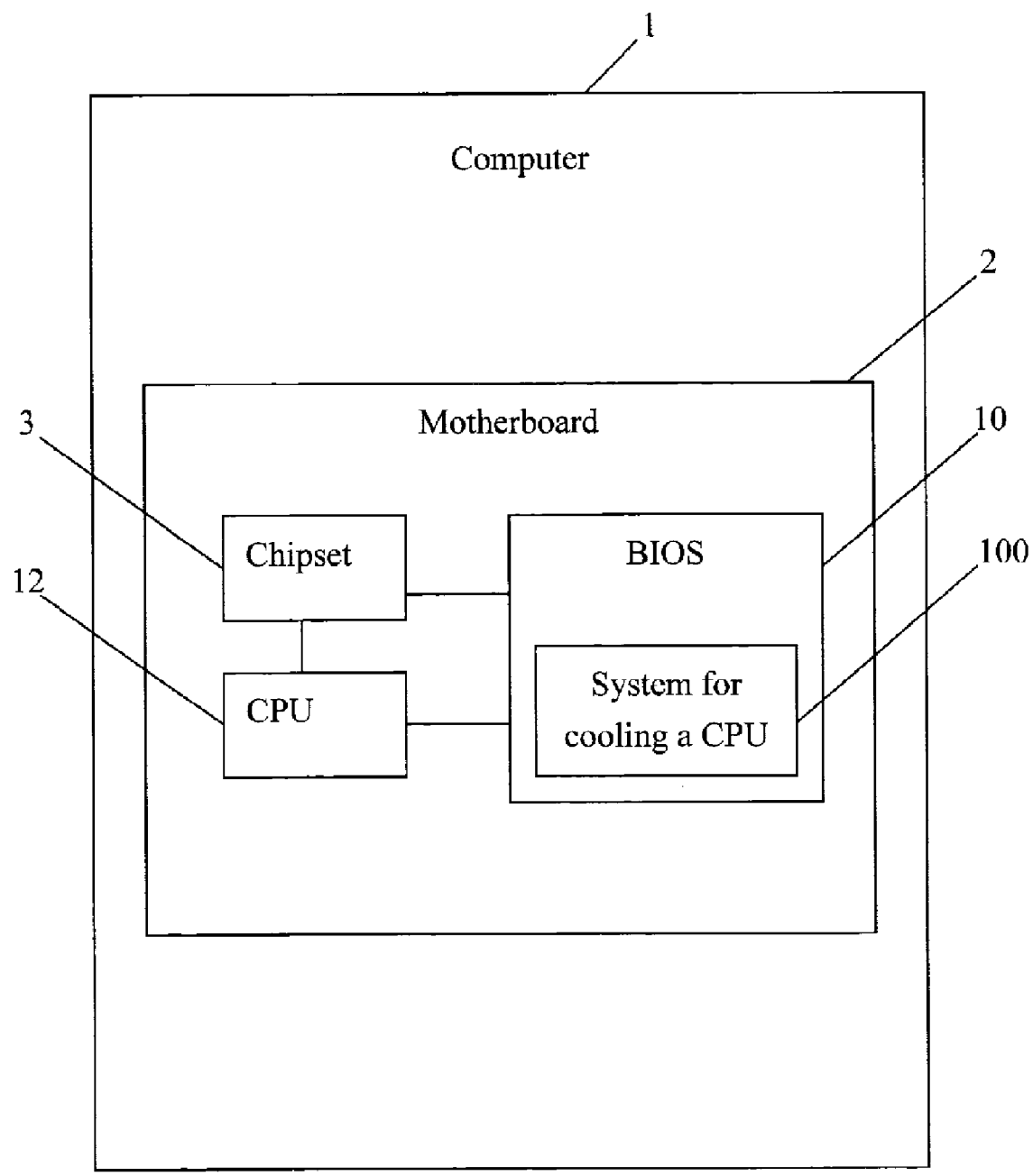
FIG. 1 is a schematic diagram of a hardware configuration of a system for cooling a CPU passively in accordance with a preferred embodiment.

FIG. 1 is a schematic diagram of a hardware configuration of a system for cooling a CPU passively in accordance with a preferred embodiment. The system for cooling a CPU passively (hereinafter, "the system") 100 is stored in a basic input output system (BIOS) 10 that is connected with a central processing unit (CPU) 12. The CPU 12 connects with a chipset 3. The chipset 3, the BIOS 10, and the CPU 12 are all coupled to a motherboard 2. The motherboard is configured in a computer 1.

Figure 2:
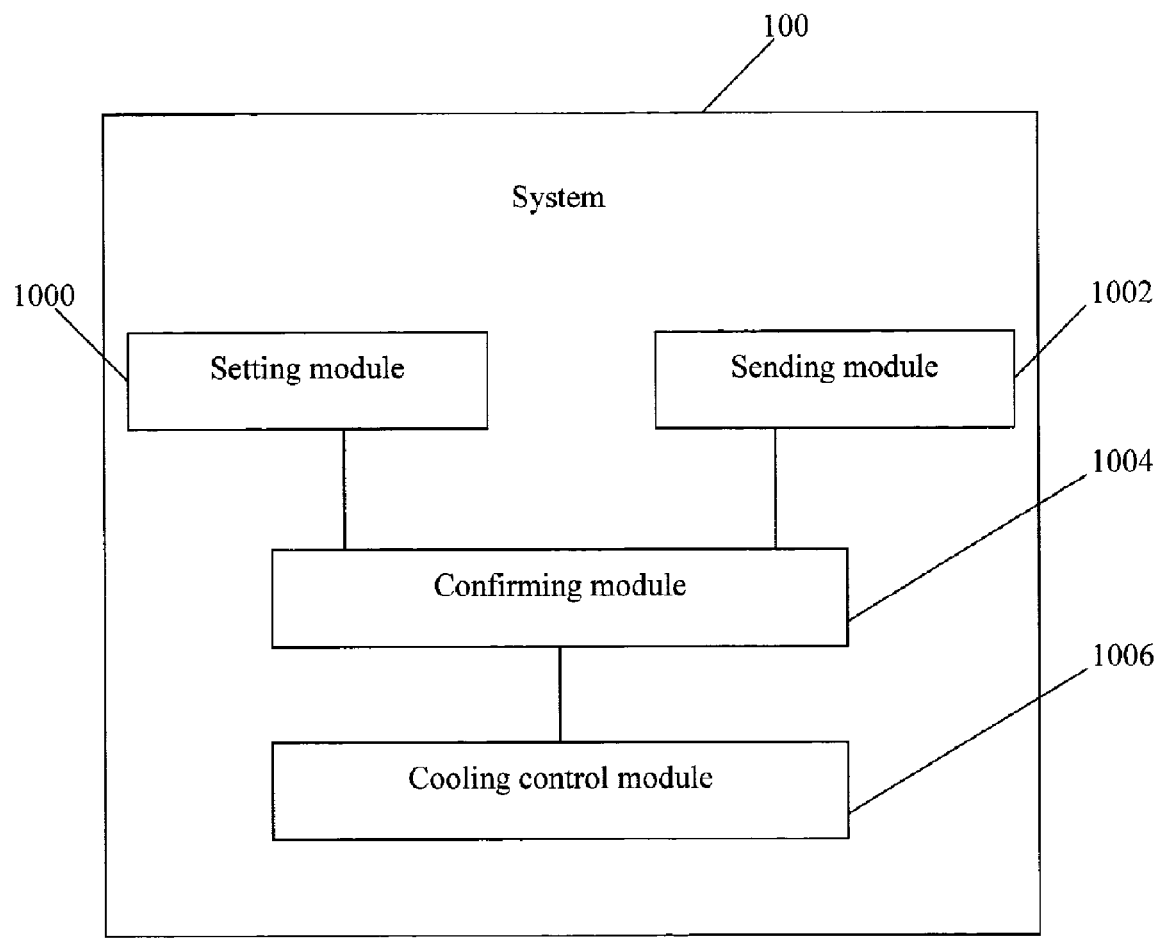
FIG. 2 is a schematic diagram of main software function modules of the system of FIG. 1.

FIG. 2 is a schematic diagram of main software function modules of the system 100. The system 100 includes a setting module 1000, a sending module 1002, a confirming module 1004, and a cooling control module 1006.

The setting module 1000 is configured for accessing the BIOS 10, and for setting a passive cooling mode. The setting module 1000 is also configured for setting a critical temperature TMP2 such that the CPU 12 would be permanently damaged if a temperature of the CPU 12 is higher than the critical temperature TMP2, and a reference temperature TMP1 that is lower than the critical temperature TMP2. If the temperature of the CPU 12 is between the reference temperature TMP1 and the critical temperature TMP2, the CPU 12 would enter into the passive cooling mode. Normally, the CPU 12 is cooled by CPU fans (not shown), in the passive cooling mode, the CPU 12 is not only cooled by the CPU fans, but is also controlled to reduce its heat by utilizing the cooling control module 1006 to switch its statuses.

The reference temperature TMP1 and the critical temperature TMP2 are both set in the BIOS 10. For example, the reference temperature TMP1 is set at 70 degrees centigrade, and the critical temperature TMP2 may be a certain value between 80 degrees centigrade and 90 degrees centigrade, such as 86 degrees centigrade.

The setting module 1000 is further configured for setting a plurality of temperature intervals between the reference temperature TMP1 and the critical temperature TMP2, and for predetermining a duty cycle of the CPU 12 corresponding to each temperature interval. A duty cycle is a ratio of active time to the total cycle time of the CPU 12.

For example, the reference temperature TMP1 is set at 70 degrees centigrade, the critical temperature TMP2 is set at 86 degrees centigrade, and the setting module 1000 sets a plurality of temperature intervals every 2 degrees centigrade, such as (70, 72), (72, 74), and so on. Each temperature interval corresponds to one predetermined duty cycle. The relationship between the temperature intervals and the predetermined duty cycles can be defined as a linear relationship, an exponential relationship or other kinds of relationship according to computer specification. The computer specification includes different types of the CPUs 12, configurations of computer cases, cooling capabilities, etc. That is, a temperature interval of (70, 72) corresponds to a predetermined duty cycle of 12.5%, a temperature interval of (72, 74) corresponds to a predetermined duty cycle of 25%, and a temperature interval of (80, 82) corresponds to a predetermined duty cycle of 87.5%.

The sending module 1002 is configured for detecting and recording a current temperature TMP of the CPU 12 by sending periodic system management interrupts (SMIs) to the CPU 12. The SMIs have a high interrupt priority. Once the SMIs are sent out, the CPU 12 enters into a system management random access memory (SMRAM) under a system management mode (SMM) for executing special commands, such as a command for detecting the current temperature TMP of the CPU 12.

The confirming module 1004 is configured for comparing the current temperature TMP with the reference temperature TMP1 and the critical temperature TMP2, for confirming which temperature interval the current temperature TMP falls in, and for confirming a corresponding predetermined duty cycle according to the temperature interval. For example, if the current temperature TMP is 81 degrees centigrade, the corresponding temperature interval is (80, 82), and the corresponding predetermined duty cycle is 87.5%.

If the confirming module 1004 confirms that the current temperature TMP is between the reference temperature TMP1 and the critical temperature TMP2, the cooling control module 1006 is configured for entering into the passive cooling mode, and for switching the CPU 12 between a working status and a sleeping status according to the predetermined duty cycle confirmed before, thereby cooling the CPU 12. The cooling control module 1006 is further configured for discontinuing power to the CPU 12 if the confirming module 1004 confirms that the current temperature TMP is higher than the critical temperature TMP2.

For example, the chipset 3 contains various functions for supporting the CPU 12. A throttling duty cycle of the chipset 3 can be defined as 1024 peripheral component interconnection (PCI) clock cycles. The 1024 PCI clock cycles equal to about 31 microseconds. The cooling control module 1006 signals the chipset 3 to generate STPCLK# signals to stop a CPU 12 clock. If the current temperature TMP of the CPU 12 reaches at 82 degrees centigrade, the corresponding predetermined duty cycle is 87.5%. Thus, the cooling control module 1006 defines the chipset 3 to control the CPU 12 to sleep for 896 PCI clock cycles according to a product of 1024 PCI clock cycles and the predetermined duty cycle 87.5% (1024*87.5%), and then controls the CPU 12 to work 128 PCI clock cycles according to a product of 1024 PCI clock cycles and 12.5% (1−87.5%). The 896 PCI clock cycles equal to about 27 microseconds, and the 128 PCI clock cycles equal to about 4 microseconds.

Figure 3:
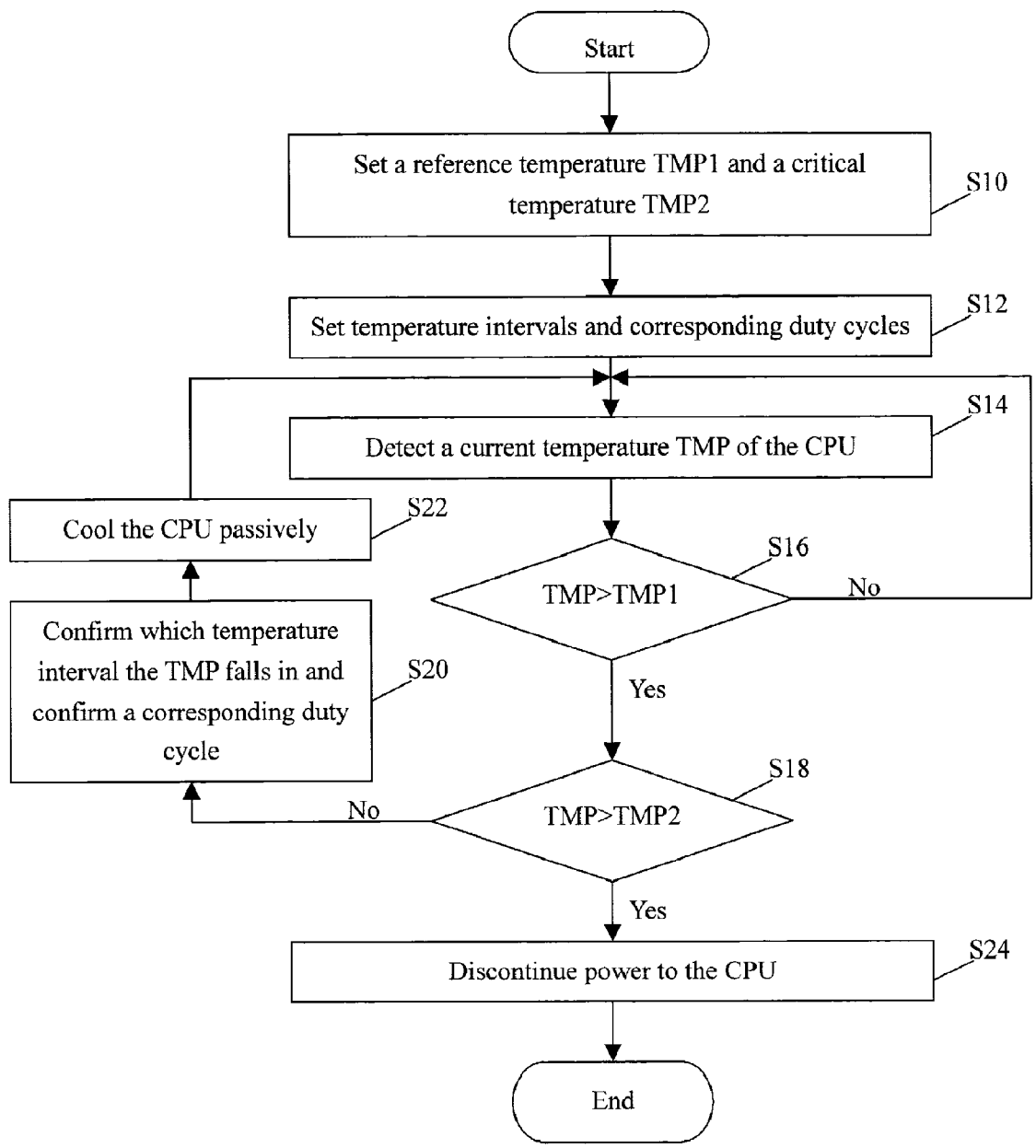
FIG. 3 is a flowchart of a method for cooling a CPU passively in accordance with a preferred embodiment.

FIG. 3 is a flowchart of a method for cooling a CPU passively. In step S10, the setting module 1000 enters in the BIOS 10, sets the passive cooling mode, and sets the critical temperature TMP2 and the reference temperature TMP1 that is lower than the critical temperature TMP2.

In step S12, the setting module 1000 sets a plurality of temperature intervals between the reference temperature TMP1 and the critical temperature TMP2, and predetermines the duty cycles corresponding to the temperature intervals. In step S14, the sending module 1002 detects the current temperature TMP of the CPU 12 through sending the periodic SIMs to the CPU 12.

In step S16, the confirming module 1004 compares the current temperature TMP with the reference temperature TMP1. If the current temperature TMP is higher than the reference temperature TMP1, in step S18, the confirming module 1004 compares the current temperature TMP with the critical temperature TMP2. Otherwise, if the current temperature TMP is not higher than the reference temperature TMP1, the procedure returns to step S14.

In step S20, if the current temperature TMP is lower than the critical temperature TMP2, the cooling control module 1006 enters into the passive cooling mode, the comparing module 1004 confirms which temperature interval the current temperature TMP falls in, and confirms a corresponding predetermined duty cycle according to the temperature interval.

In step S22, the cooling control module 1006 switches the CPU 12 between the working status and the sleeping status according to the predetermined duty cycle confirmed, thereby cooling the CPU 12 passively. The procedure returns to step S14.

If the current temperature TMP is higher than the critical temperature TMP2, in step S24, the cooling control module 1006 discontinues power to the CPU 12.

It should be emphasized that the above-described embodiments, particularly, any "preferred" embodiments, are merely possible examples of implementations, merely set forth for a clear understanding of the principles of the invention. Many variations and modifications may be made to the above-described preferred embodiment(s) without departing substantially from the spirit and principles of the invention. All such modifications and variations are intended to be included herein within the scope of this disclosure and the above-described preferred embodiment(s) and protected by the following claims.

What is claimed is:

1. A computer-enabled method for cooling a CPU, the method comprising the steps of:
  accessing a basic input output system (BIOS), setting a passive cooling mode;
  setting a critical temperature and a reference temperature in the BIOS, the reference temperature being lower than the critical temperature;
  setting a plurality of temperature intervals between the reference temperature and the critical temperature;
  predetermining a duty cycle corresponding to each temperature interval;
  sending a system management interrupt to the CPU for controlling the CPU to execute a command of detecting and recording a current temperature of the CPU;
  comparing the current temperature with the reference temperature and the critical temperature;

entering into the passive cooling mode if the current temperature is between the reference temperature and the critical temperature;

confirming which temperature interval the current temperature falls in;

confirming a corresponding predetermined duty cycle according to the temperature interval; and switching the CPU between a working status and a sleeping status according to the confirmed predetermined duty cycle, thereby cooling the CPU.

2. The method according to claim 1, wherein the CPU enters into a system management random access memory (SMRAM) under a system management mode (SMM) for executing the command of detecting and recording a current temperature of the CPU.

3. The method according to claim 1, further comprising the step of:

discontinuing power to the CPU if the current temperature is higher than the critical temperature.

4. The method according to claim 1, further comprising the step of:

returning to the detecting step if the current temperature is lower than the reference temperature.

5. A computer system for cooling a CPU, the system comprising:

a basic input output system (BIOS), the BIOS being connected with the CPU a setting module configured for accessing the BIOS, setting a passive cooling mode, setting a critical temperature and a reference temperature in the BIOS, setting a plurality of temperature intervals between the reference temperature and the critical temperature, and predetermining a duty cycle corresponding to each temperature interval, the reference temperature being lower than the critical temperature;

a sending module configured for sending a system management interrupt to the CPU for controlling the CPU to execute a command of detecting and recording a current temperature of the CPU;

a confirming module configured for comparing the current temperature with the reference temperature and the critical temperature; and a cooling control module configured for entering into the passive cooling mode if the current temperature is between the reference temperature and the critical temperature;

the confirming module further configured for confirming which temperature interval the current temperature falls in, and confirming a corresponding predetermined duty cycle according to the temperature interval;

the cooling control module further configured for switching the CPU between a working status and a sleeping status according to the confirmed predetermined duty cycle, thereby cooling the CPU.

6. The system as claimed in claim 5, wherein the CPU enters into a system management random access memory (SMRAM) under a system management mode (SMM) for executing the command of detecting and recording a current temperature of the CPU.

7. The system as claimed in claim 5, wherein the cooling control module is further configured for discontinuing power to the CPU if the current temperature is confirmed to be higher than the critical temperature.

8. The system as claimed in claim 5, wherein temperature damage is caused to the CPU if the current temperature exceeds the critical temperature.

\* \* \* \* \*

UNITED STATES PATENT AND TRADEMARK OFFICE
CERTIFICATE OF CORRECTION

| | |
|---|---|
| PATENT NO. | : 7,664,977 B2 |
| APPLICATION NO. | : 11/309704 |
| DATED | : February 16, 2010 |
| INVENTOR(S) | : Fei-Zhou Wang |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 466 days.

Signed and Sealed this

Seventh Day of December, 2010

David J. Kappos
*Director of the United States Patent and Trademark Office*